US006567712B1

(12) United States Patent
Rog et al.

(10) Patent No.: US 6,567,712 B1
(45) Date of Patent: May 20, 2003

(54) METHOD FOR DETERMINING THE CO-ORDINATES OF A SATELLITE

(75) Inventors: Andrey Leonidovich Rog, Moscow (RU); Natalia P. Kakoshkina, Saint-Petersburg (RU); Vladimir N. Ivanov, Saint-Petersburg (RU); Gennady S. Tzekhanovich, Saint-Petersburg (RU); Viktor I. Malashin, Saint-Petersburg (RU); Serguey B. Pisarev, Saint-Petersburg (RU); Denis G. Poverennyi, Saint-Petersburg (RU); Boris V. Shebshaevich, Saint-Petersburg (RU); Mikhail Yu. Silin, Moscow (RU)

(73) Assignee: Samsung Electronics Co., Ltd., Gyungki (KR)

( * ) Notice: Subject to any disclaimer, the term of this patent is extended or adjusted under 35 U.S.C. 154(b) by 0 days.

(21) Appl. No.: 09/600,994

(22) PCT Filed: Dec. 2, 1998

(86) PCT No.: PCT/RU98/00402

§ 371 (c)(1),
(2), (4) Date: Nov. 1, 2000

(87) PCT Pub. No.: WO00/33030

PCT Pub. Date: Jun. 8, 2000

(51) Int. Cl.[7] ............................................. G01C 21/12
(52) U.S. Cl. ............... 700/56; 342/357.02; 342/357.06; 701/13; 701/214; 701/226
(58) Field of Search .............................. 700/56; 701/13, 701/207, 213, 214, 226; 342/352, 357.01, 357.02, 357.06, 357.08, 357.12

(56) References Cited

U.S. PATENT DOCUMENTS 5,731,786 A * 3/1998 Abraham et al. ........... 342/357
5,787,384 A   7/1998 Johnson ..................... 701/216
6,085,128 A * 7/2000 Middour et al. ............. 701/13
6,337,657 B1 * 1/2002 Zhodzishsky et al. . 342/357.02
6,441,780 B1 * 8/2002 Rog et al. .............. 342/357.12
6,441,781 B1 * 8/2002 Rog et al. .............. 342/357.12

FOREIGN PATENT DOCUMENTS

DE          3033279          4/1982

OTHER PUBLICATIONS

International Search Report.
Mischenko I.N. et al. "Novye razrabotki sputnikovykh radioonavigatsionnykh sistem". V: "Zarubezhnaya radioelectronika" No. 1, Moscow, "Radio i svyaz", 1989, p. 71, pravy stolbets, lines 1–27 from the top.
Setevye Sputnikovye radionavigatsionnye sistemy. lzd. 2–e under "edetoiship". Shebshaeircha V.S., Moscow, "Radio i svyaz", 1993, p. 18, 1st paragraph, p. 19, latest paragraph, p. 20, lines 1–18.

* cited by examiner

*Primary Examiner*—Paul P. Gordon
(74) *Attorney, Agent, or Firm*—Sughrue Mion, PLLC (57) ABSTRACT

The invention relates to the field of radio navigation and, more specifically, it relates to methods of determining the current values of the orbital position of the artificial satellite of the Earth which is used in a satellite radio navigation system (SRNS), by the ephemeredes and can be used when performing the radio navigation measurements in the equipment of the consumers of the SRNS signals. The variants of a fast method for determining the coordinates of the satellite are proposed, which consist in that the satellite coordinates are determined at preset points of the orbit spaced from each other by a selected time interval, and further determining the velocities of the satellite at the nodal points, while at the points between the nodal points the satellite coordinate are determined in the geocentric inertial system of coordinates are in a system the Greenwich geocentric coordinates using special formulas or the Taylor polynomial of the second or third order, and determining these at the nodal points using the six-order Taylor polynomial.

8 Claims, 11 Drawing Sheets

METHOD FOR DETERMINING THE CO-ORDINATES OF A SATELLITE

TECHNICAL FIELD

The invention relates to the field of radio navigation and, more specifically, the invention relates to the methods for determining the current values of the orbital position of the artificial satellite of the Earth operating in a satellite radio navigation system (SRNS) by the ephemeredes, and can be used for performing the radio navigation measurements in the equipment of the users of the SRNS signals.

PRIOR ART

It is well known, that the navigational receivers in the equipment of the users of the SRNS GPS and/or GLONASS signals, determine their coordinates and speed using the quasi-range and quasi-velocity measurements relative to the current position (coordinates) of satellites on orbit (cf. Network Satellite Radio Navigation Systems, V. S. Sebshaevich, P. P. Dmitriev, N. V. Ivantsevich et al., Moscow, Radio i Svyaz publishers, 1993, pages 110–114, FIG. 7.3) [1]. The current values of the coordinates of the satellites at the moments of measurements are calculated in the receiver. The calculation is based on the ephemeris data transmitted by each SRNS satellite. Since the ephemeredes of the satellite are the coordinate and the velocity and acceleration component defined by the Sun and Moon attraction and are transmitted only during defined periods of time, all current (intermediate) coordinates of the satellite on its orbit are determined by means of prediction including extrapolation (see [1] pages 20–21, 29–31, 165–166, 171–173).

The known methods of determining the current orbital position (coordinates) of the SRNS satellite are based on the prediction (extrapolation) of the orbital motion stemming from the a priori known coordinates of the satellite on the orbit at a given instant of time and taking into account the known disturbing factors. The commonly known forms of representation of the orbital motion are temporal polynomials in the rectangular coordinates; harmonic approximations in the rectangular coordinates; temporal polynomials in elements; harmonic approximations in the elements (cf. [1], page 172).

The known methods of determination if the current coordinates of the SRNS satellite based on the prediction (extrapolation) of the orbital motion are characterized by a high cost of computational procedures (complex and costly processors are used) and a low speed of response.

A computationally simple method of calculations is based on the use of the orbit of the polynomial approximations in coordinates (cf. [1], page 172).

Known in the art is a more accurate but low-speed method based on the representation of the orbital motion as a harmonic approximation in the elements (cf. [1]) page 172–173). Also known in the art is an example of successive calculations of the orbital motion based on such a method, as applied to the SRNS GPS satellite (see, or example, GPS Navigation Message, A. J. Van Dierendonck, S. S. Russell, E. R. Kopitzke et al., Navigation (USA), 1978. Vol.25, #2, p. 146–165) [2]. A specific feature of the method [2] is that the same algorithm of evaluations is used at any instant, and since the calculations are made in a full scope at each instant of time, the speed of response of this method is also low.

A similar disadvantage may be found n the method recommended by the document "ICD GPS-200" (cf. ICD Navstar GPS Space Segment/Navigation User Interface) [3] as a standard method of determining the current coordinates of the SRNS GSP satellite. In practice, the time of calculation of one point on the orbit is effected, on the average, in 1.850 ms.

As a prior art, a relevant method is described in the "Interface Control Document" for the GLONASS system (cf Global Navigational Satellite System—GLONASS, Interface Control Document KNITS VKS Research Institute, Russia 1995 [4] recommended as a standard for determining the current coordinates of the satellite by the ephemeredes). In various embodiments of practical realization, the prior art method can use the Runge-Kutta technique of the fourth order for integration of the differential equations of motion of the satellite on orbit, extrapolation and construction of a predicted path. The calculation time in this method depends on the value of the extrapolation interval. For realization of the prior art method there can also be used a more cost-effective computational technique based on the six-order Taylor polynomial ensuring the accuracy required in the differential method of navigational determinations. The time of calculation by the Taylor polynomial (processor TMS320C203, language "C", the data with a fixed point only) is equal to 0.675 ms for one satellite.

The realization of the prior art method is rather complex in the computational aspect, especially in the case of using a simple inexpensive processor (for example, without hardware support of the operations with a floating point), where the calculations might require an unacceptably long time. This is associated with the fact that the standard and rather complex algorithm of calculations is applied for an instant of time, i.e. for the calculation of all current points of orbital motion of the satellite.

SUMMARY OF THE INVENTION

The claimed invention solves an engineering problem of reduction of the computing and time expenses when determining the path of the SRNS satellite, i.e. makes it possible to use relatively simple and inexpensive processors while reducing the time of calculations.

This task is attained by using a combined (two-step) process of determining the path of a satellite, when the standard algorithm is used for calculation of only definite nodal points of the path—once in a time interval, while the calculation of the intermediate point of the path within this interval is effected by means of a simplified procedure, i.e. using simple polynomial formulas whose coefficients are calculated at the first step of application of the standard computational algorithm.

The essence of the invention is described as follows. In the method of determining the coordinates of the SRNS satellite on the orbit by the ephemeredes, where a priori known ephemeredes at an initial time instant are used for determining the extrapolated position of the satellite on orbit at a series of arbitrary points, a standard computational algorithm is used for determining the coordinates of the satellite only at some nodal points of the orbit spaced from each other by a selected time interval. In addition, the satellite velocity is determined at the nodal points. Meanwhile, at the intermediate points between the nodal points, the satellite position is determined using a simplified computational algorithm based on polynomial formulas, the coefficients for which are calculated based on the coordinates and velocity of the satellite at the nodal points.

In a method according to an embodiment of the invention, the coordinates and velocity of the SRNS GLONASS satellite at the nodal points of the orbit are determined using the standard computational procedure and the six-order Taylor polynomial, while the satellite coordinates at the intermediate orbital points are determined using the Taylor polynomial of the second or third order.

BRIEF DESCRIPTION OF THE DRAWINGS

The embodiments of the invention, a possibility of its realization and industrial application are illustrated in the block-diagram of the computational algorithm for calculation of the satellite coordinates on the orbit and the graphs presented in FIGS. 1–11, in which.

1: $t=t_{start}$, $t_y=t_{ia}$
2: calculation of $X_s$ at $t_y$, using the standard method
3: calculation of $V_s$ at $t_y$
4: calculation of the coefficients of the simplified algorithms
5: $t_y-t>0$
6: $t_{y-1}=t_y$
7: $X_s(t_{y-1})=X_s(t_y)$; $V_s(t_{y-1})=V_s(t_y)$; $K_s(t_{y-1})=K_s(t_y)$;
8: $t_y=t_y+t_{int}$
9: calculation of $X_s$ at $t_y$ using the standard method
10: calculation of $V_s$ at $t_y$
11: calculation of the coefficients of the simplified algorithms
12: $t_{y-1}<t_{eio}/2$
13: calculation of $X_s$, $V_s$ at t from the node $t_{y-1}$ using the simple method
14: calculation of $X_s$, $V_s$ at t from the node $t_y$ using the simple method
15: $t=t+dt$
16: calculation of the coordinates and velocity at the initial instant of time
17: redesignation of the node coordinates, velocity, time and the coefficients of the simplified algorithms
18: calculation of the new node coordinates, velocity, acceleration and the coefficients of the simplified algorithms.

DETAILED DESCRIPTION OF A PREFERRED EMBODIMENT OF THE INVENTION

According to the claimed method, the current points of an orbital position (coordinates) of the SRNS satellite are determined as shown in the block diagram of the computational algorithm (FIG. 1) illustrating an example of the successive steps and interconnection of the operations.

Figure 1:
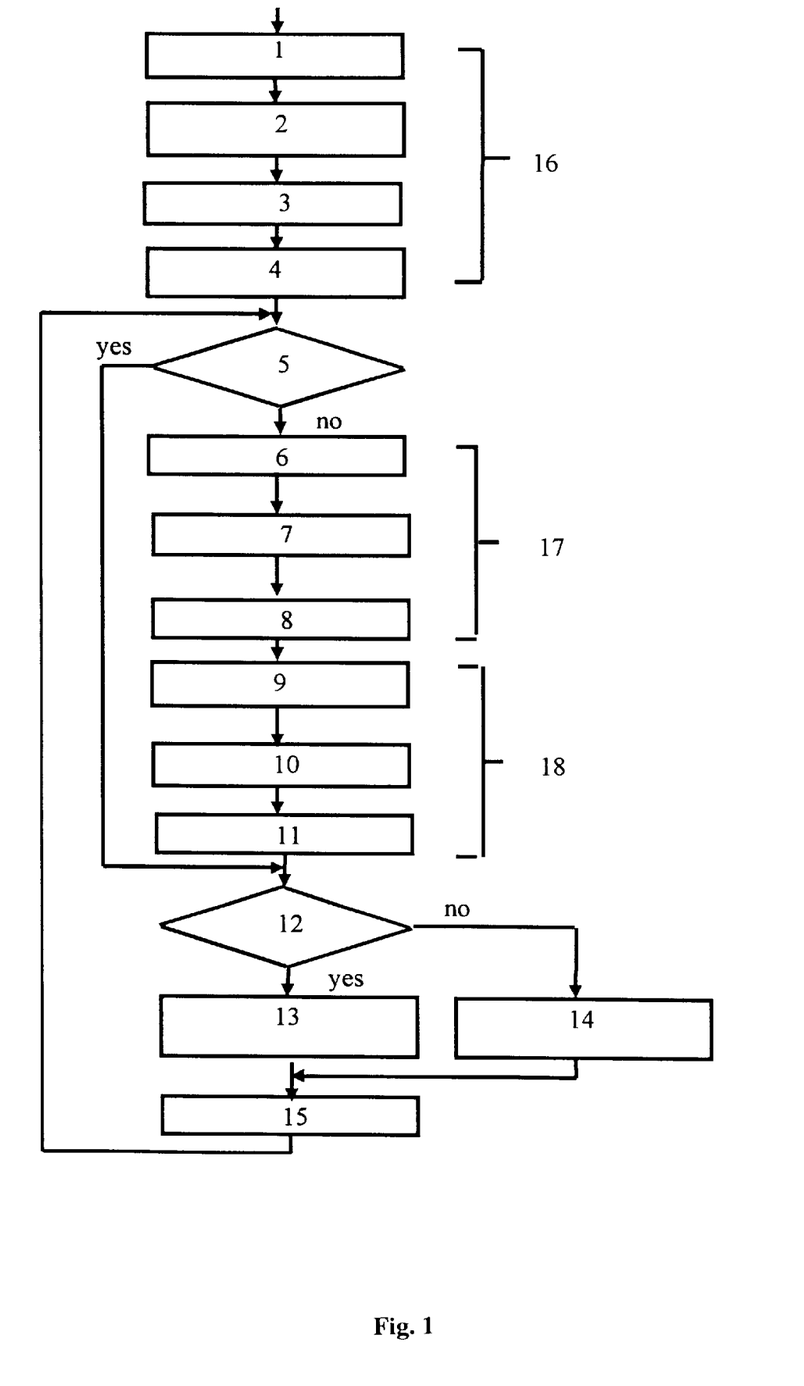
FIG. 1 is a block diagram of the algorithm, for computing the satellite coordinates using ephemeredes, according to an embodiment of the present invention. The symbols in the blocks of the block diagram denote the following.
Figure 2:
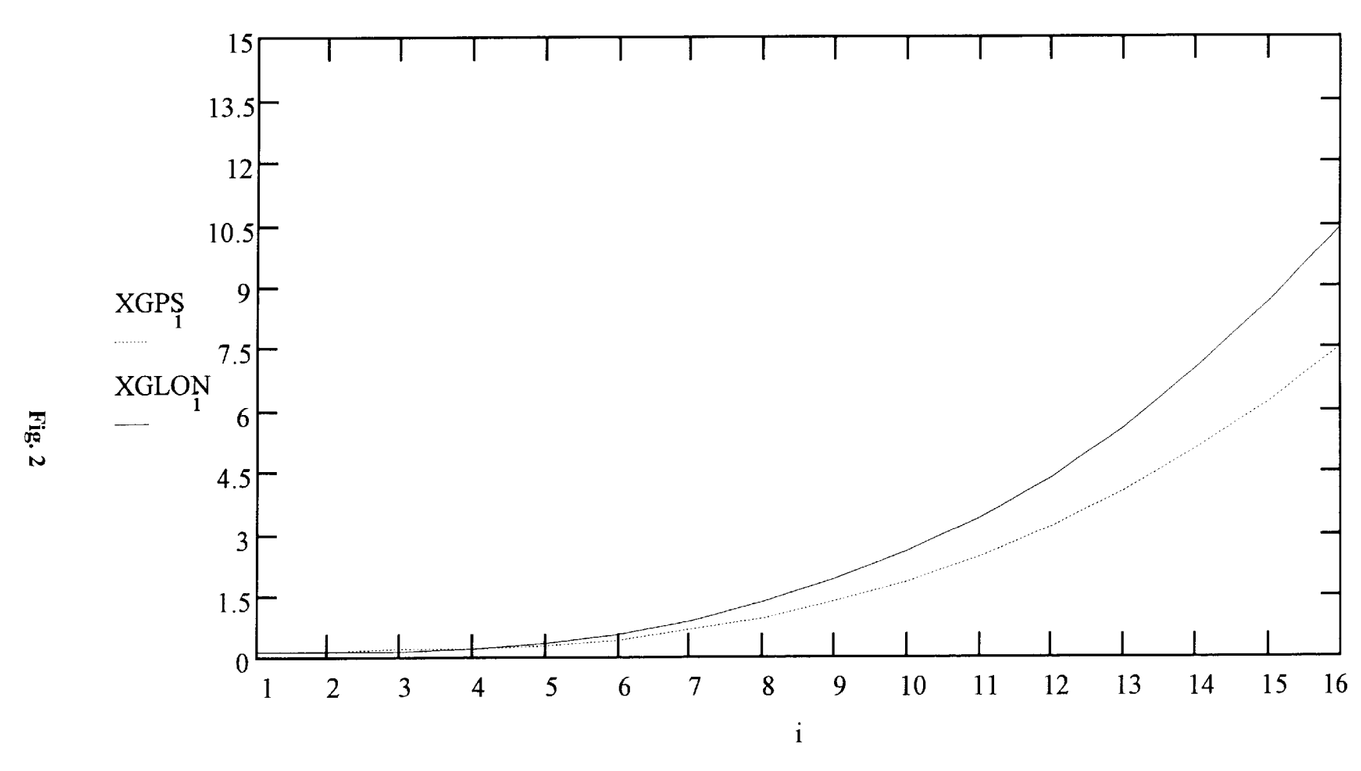
FIG. 2 illustrates the dependence of the maximum value of the mean square error of the coordinates (in meters—see the ordinate) on the interval length (in tens of seconds—see the abscissa) for the simplified algorithm "I", characterized by the use of a second-order polynomial, the continuous line standing for the values $XGLON_i$ and the dashed line standing for $XGPS_i$.
Figure 3:
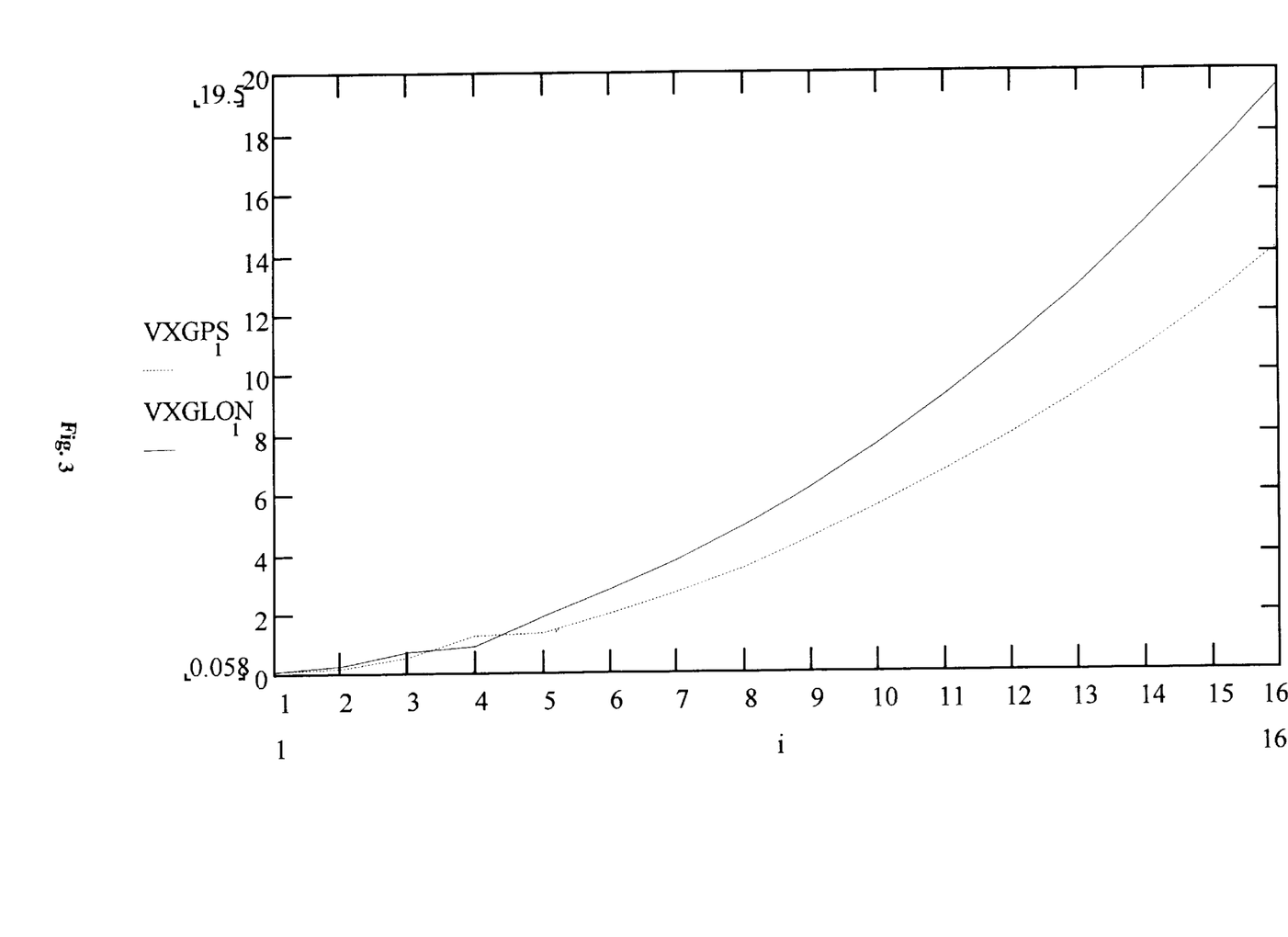
FIG. 3 illustrates the dependence of the maximum value of the mean square error of the velocities (in centimeters per second—see the ordinate) on the interval length (in tens of seconds—see the abscissa) for the simplified algorithm "I", the continuous line standing for $VXGLON_i$ and the dashed line standing for $VXGPS_i$.
Figure 4:
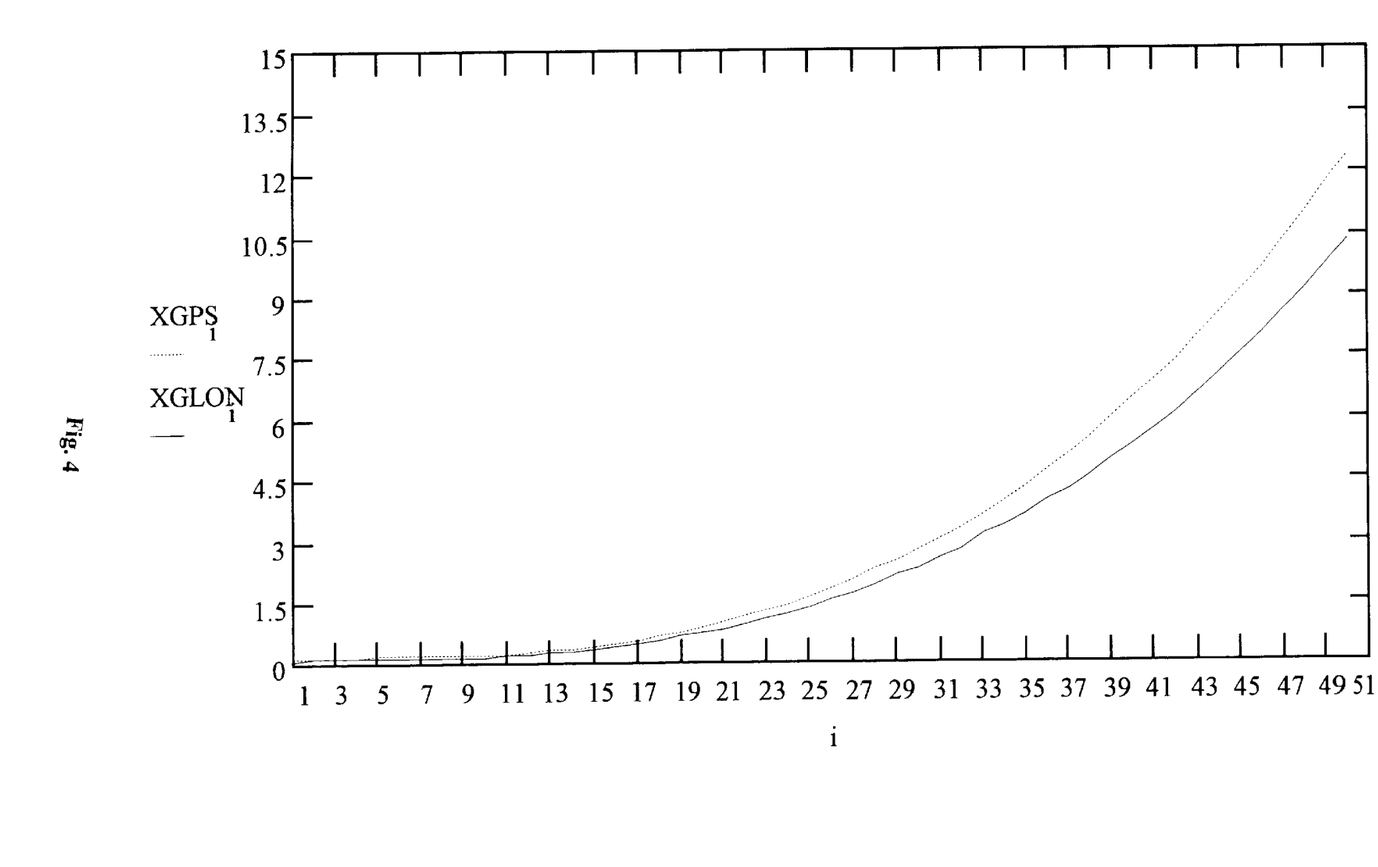
FIG. 4 illustrates the dependence of the maximum value of the mean square error of the coordinates (in meters—see the ordinate) for the simplified algorithm "II" characterized by the use of third-order Taylor polynomial, the continuous line standing for $VXGLON_i$ and the dashed line standing for $VXGPS_i$.
Figure 5:
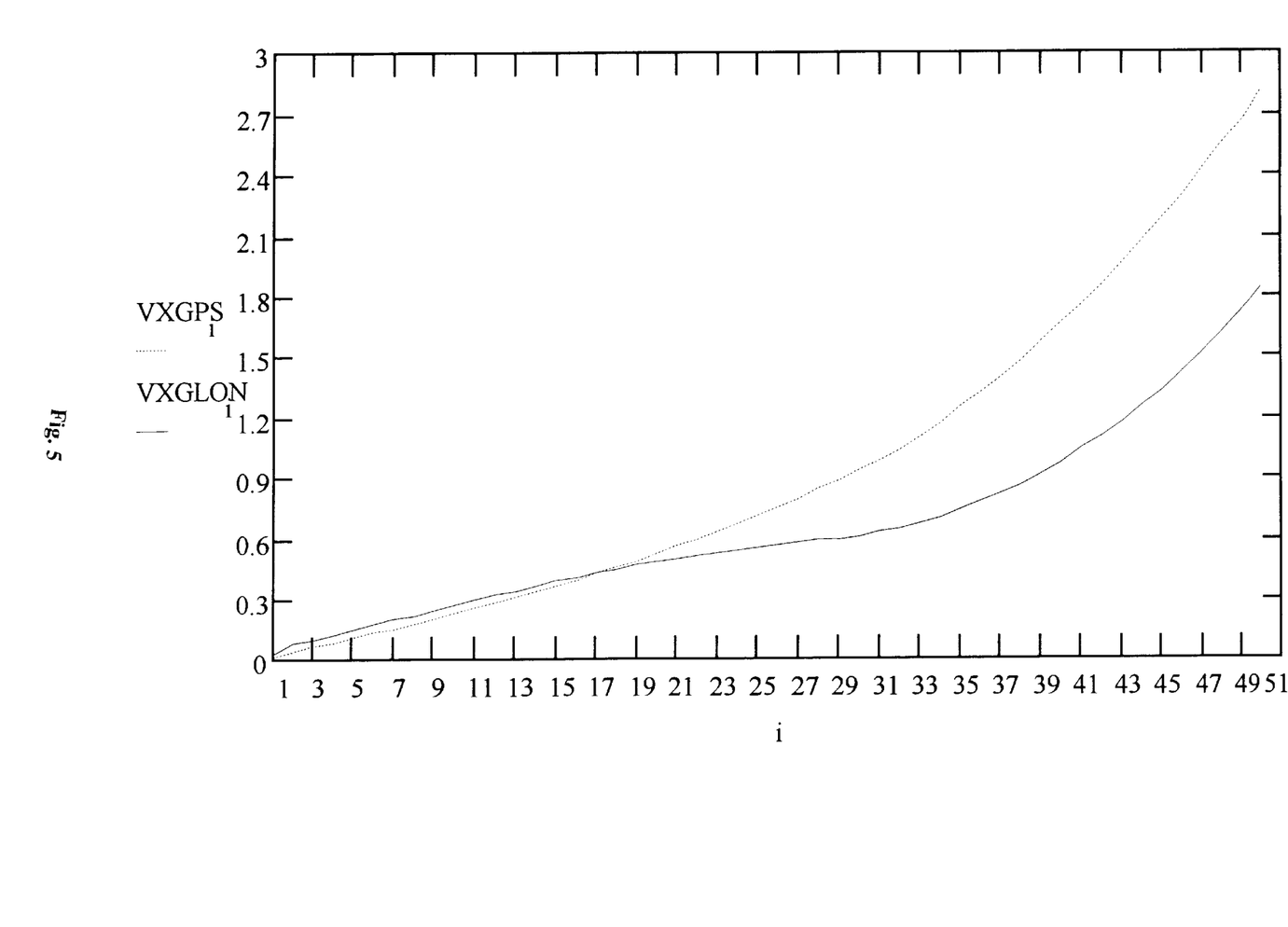
FIG. 5 illustrates the dependence of the maximum value of the mean square error of the velocities (in centimeters per second—see the ordinate) on the interval length (in tens of seconds—see the abscissa) for the simplified algorithm II, the continuous line standing for $VXGLON_i$ and the dashed line standing for $VXGPS_i$.
Figure 6:
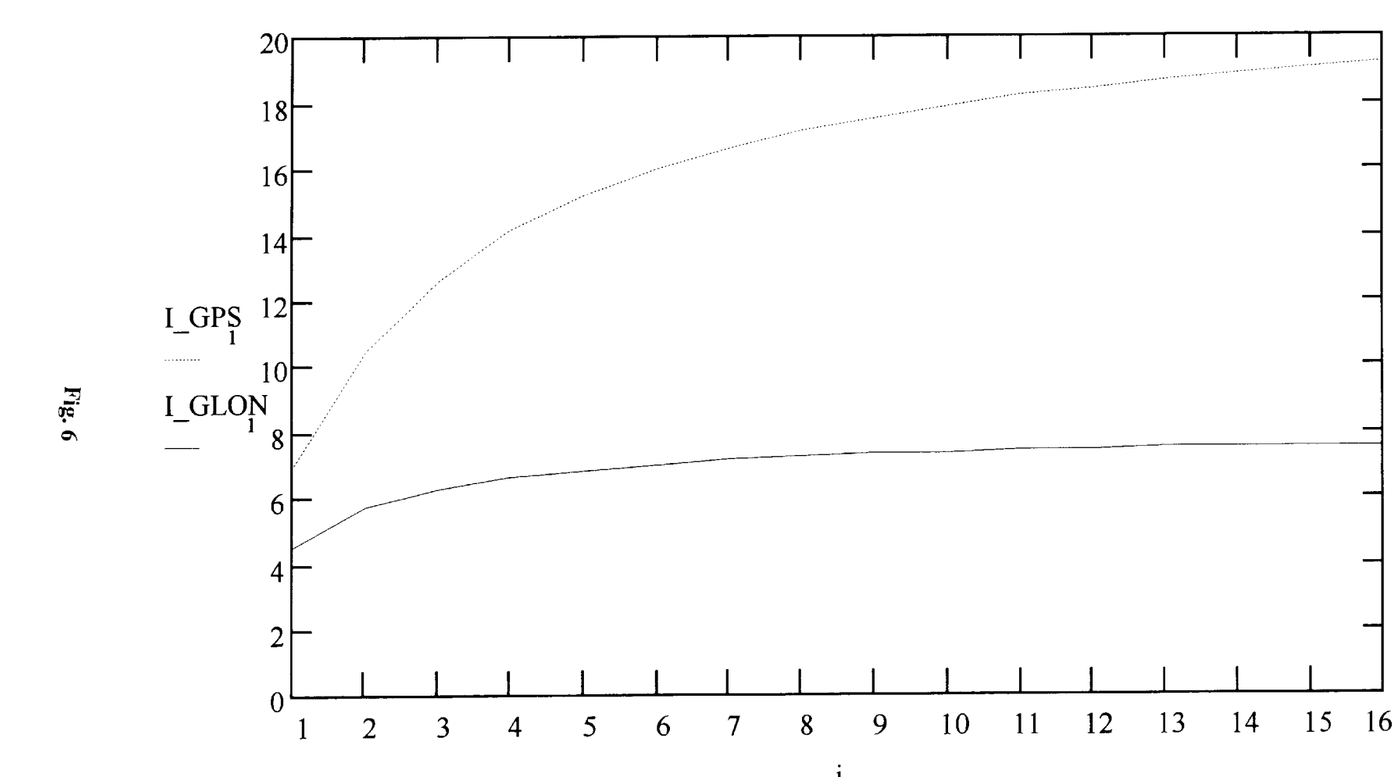
FIG. 6 illustrates the ratio of the time required for the solution using the standard algorithm to the time spent for the solution using the simplified algorithm "I" depending on the time interval between the nodal points (in tens of seconds), the continuous line standing for the values of $I\_GLON_i$ and the dashed line standing for $I\_GPS_i$.
Figure 7:
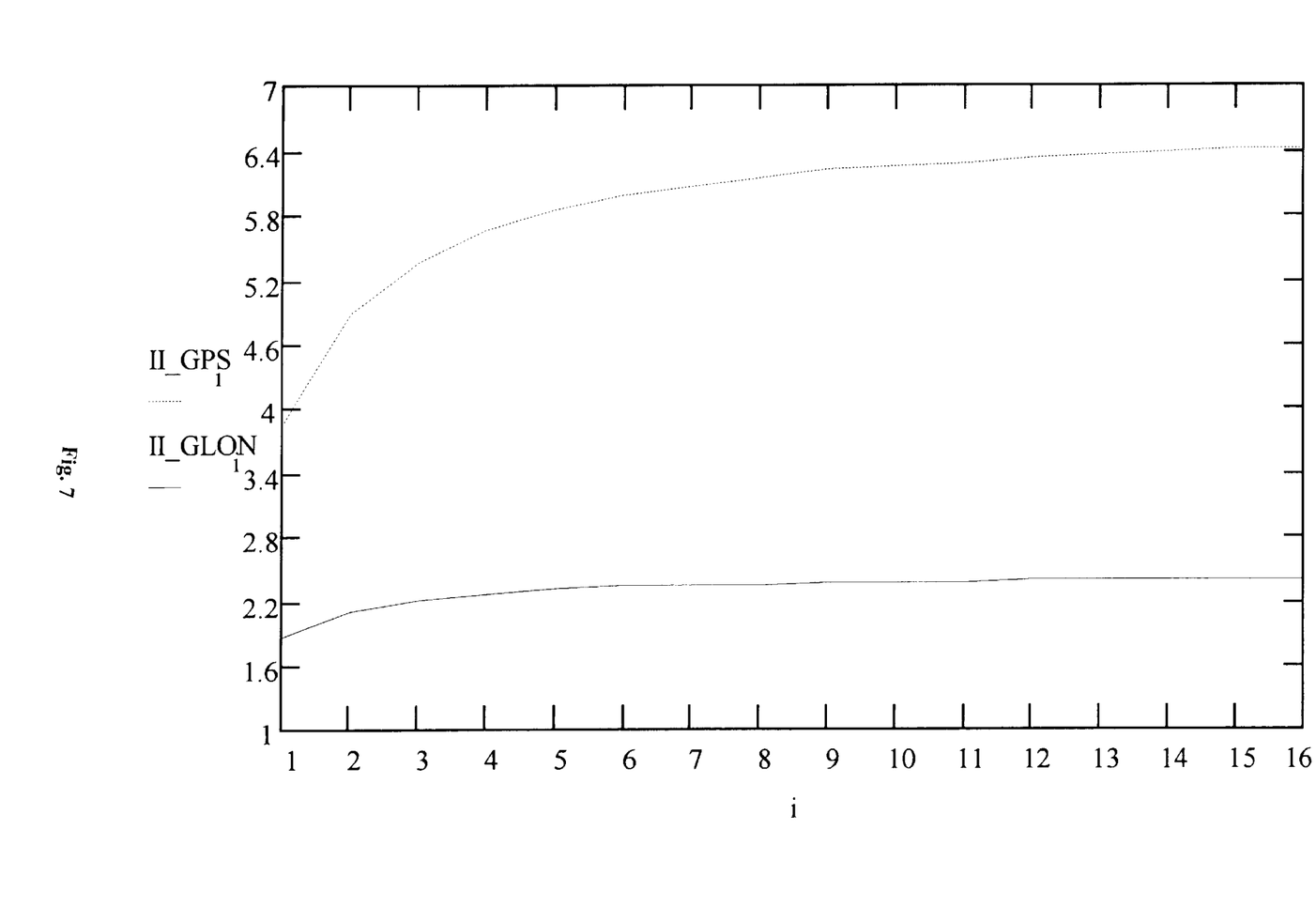
FIG. 7 illustrates the ratio of the time required for the solution using the simplified algorithm "II" to the time required for the solution by the standard algorithm depending on the time interval (in tens of seconds), the continuous line standing for the values of $II\_GLON_i$ and the dashed line standing for $II\_GPS_i$.
Figure 8:
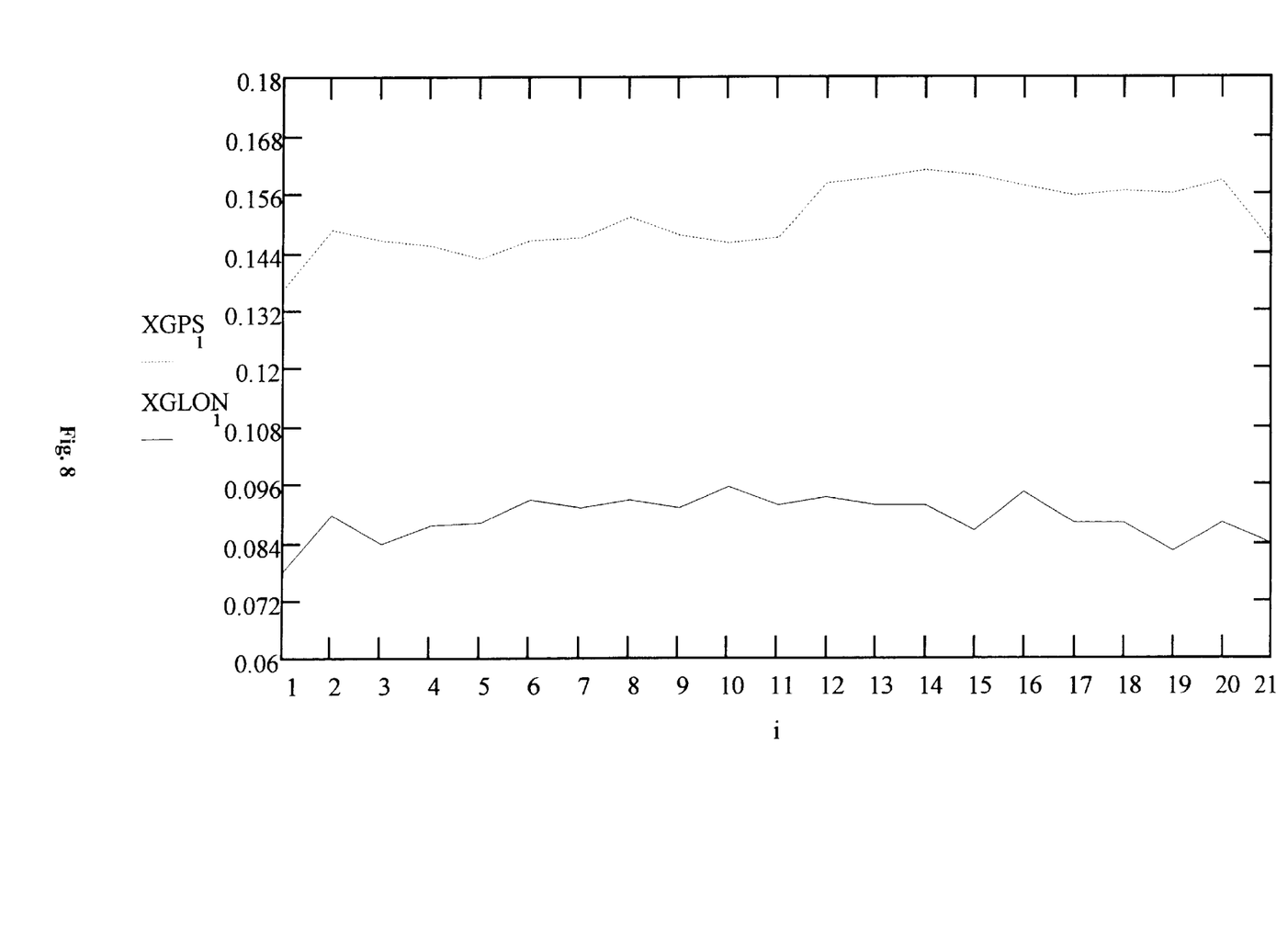
FIG. 8 illustrates the variation of the mean square error of the coordinates calculated by the simplified algorithm "I", within an interval of 20 seconds (in meters), the continuous line standing for the values $XGLON_i$ and the dotted line standing for $XGPS_i$.
Figure 9:
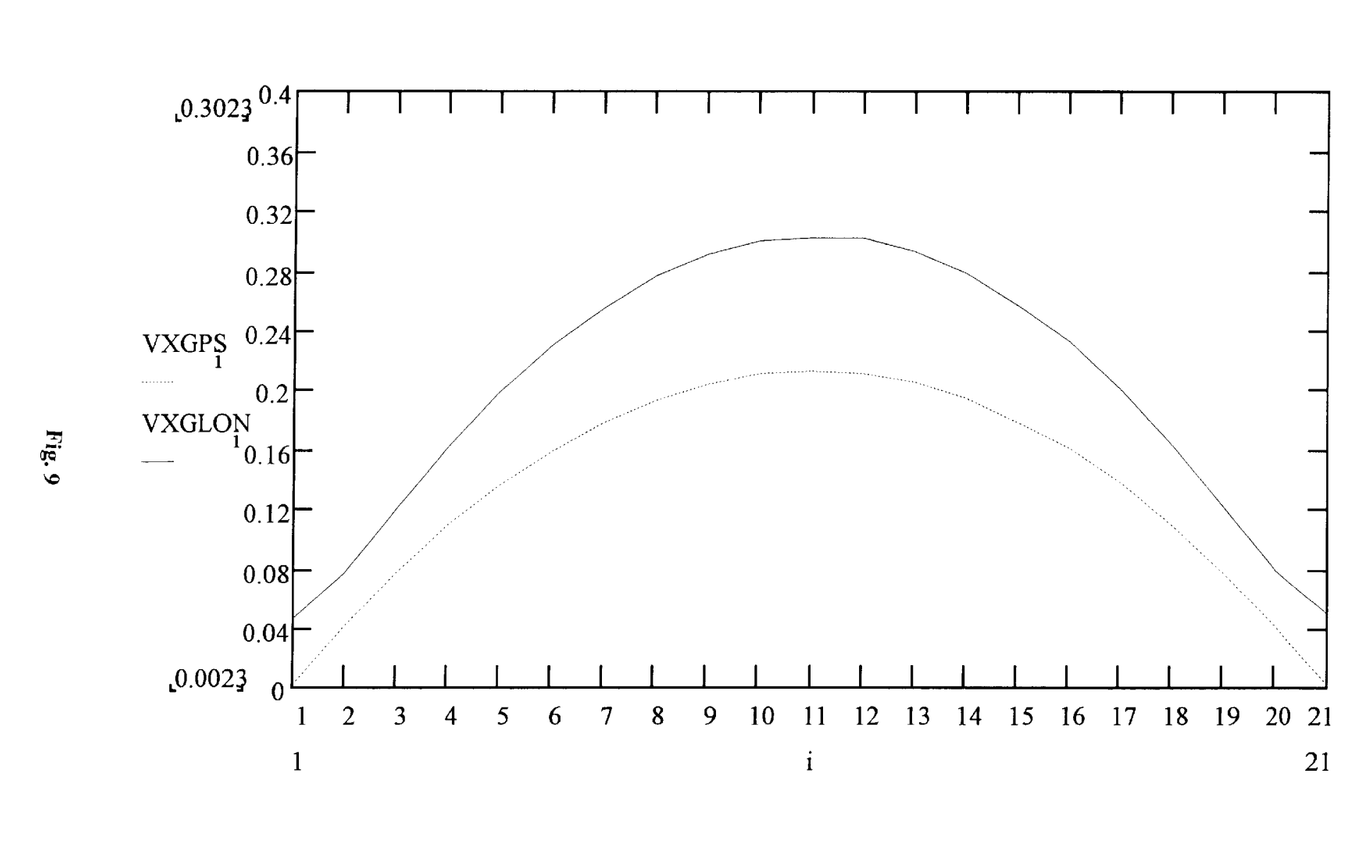
FIG. 9 illustrates the variation of the mean square error of the velocities calculated by the simplified algorithm "I", within an interval of 20 seconds (in centimeters per second), the continuous line standing for the values $VXGLON_i$ and the dashed line standing for $VXGPS_i$.
Figure 10:
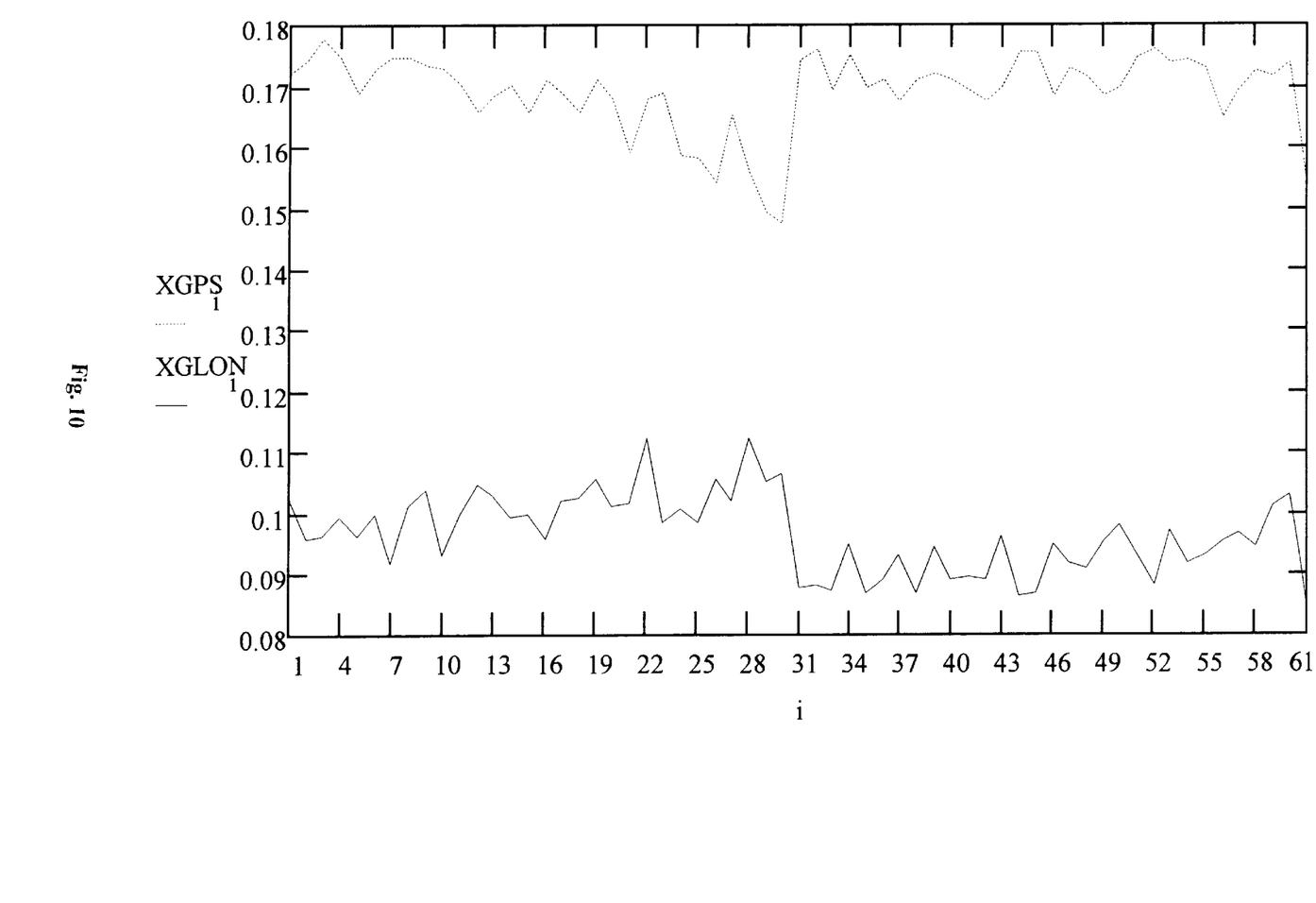
FIG. 10 illustrates the variation of the mean square error of the coordinates calculated by the simplified algorithm "II", within an interval of 60 seconds (in meters), the continuous line standing for the values $XGLON_i$ and the dashed line standing for $XGPS_i$.
Figure 11:
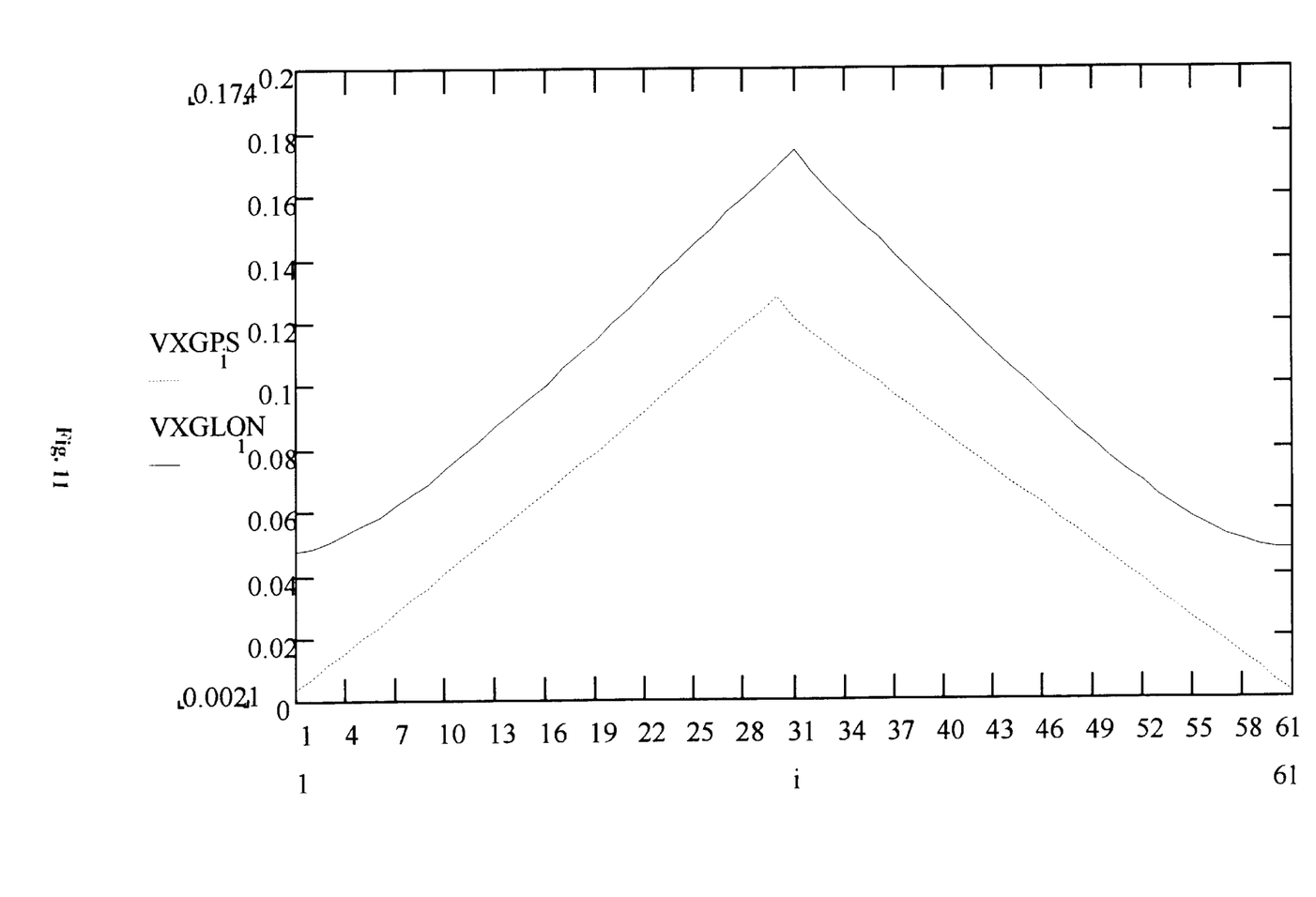
FIG. 11 illustrates the variation of the mean square error of the velocities calculated by the simplified algorithm "II", within an interval of 60 seconds (in centimeters per second), the continuous line standing for the values $VXGLON_i$ and the dashed line standing for $VXGPS_i$.

The calculation of the ephemeredes for each working satellite is effected by steps of 0.5–1.0 seconds in a time interval of 0.5 hours (the time of change of the ephemeredes) for the SRNS GLONASS satellite and of up to 1.0–2.0 hours for the SRNS GSP satellite.

The satellite coordinates are calculated in a time interval starting from some initial moment $t_{start}$. The first nodal point is assigned for an instant $t_{start}$, the next one for $t_{start}+t_{int}$. Using the a priori known ephemeredes at the initial instants of time ($t=t_{start}$), the predicted position of the satellite on the orbit (the coordinates $X_s$ and velocity speed $V_s$) at defined nodal points ($t=t_y$) spaced one from another by a selected time interval.

The calculation of the satellite coordinates at the nodal points is effected using the standard (for each SRNS) computational algorithms, in particular, for the SRNS GLONASS satellite the six-order Taylor polynomial is used.

The position of the satellite at the intermediate points of the orbit selected between the nodal points is determined using the simplified computational algorithm and polynomial formulas (algorithm "I" is the second-order polynomial, the algorithm "II" is the third-order Taylor polynomial) whose coefficients are calculated at the step of previous application of the standard computational algorithm by the position and velocity of the satellite at the nodal points. The interval between the intermediate points is selected within a range of 0.5–1.0 second. The higher-order polynomials as possible simplified algorithms are not considered since they do not have adequate computational efficiency.

The comparison of the dependencies of the increased mean square errors and saving of time depending on the time interval length (See FIGS. 2–7) allows to select an acceptable length of the interval for concrete realization. As it is evident from the graphs of the time saving evaluation, they rather quickly approach the saturation limit and mean square error grows with an increase of the interval length, therefore, the optimum intervals for the algorithm "I" are those of about 20 . . . 60 seconds, and for the algorithm "I"—60 . . . 100 seconds.

The analysis has shown, that for the differential navigation the use of the algorithm "I" is acceptable (by the accuracy criterion) within a time interval of about 20 seconds, and of the algorithm "II" with a time interval of about 60 seconds. Time of prediction of the position of the satellite on its orbit calculated by the proposed simplified algorithms makes on the average (taking into account the periodic use of the complete standard method of prediction) 0.178 ms (by the algorithm "I") and 0.314 ms (by the algorithm "II") per second for the SRNS GPS satellite and 0.119 ms (by the algorithm "I") and 0.290 ms (by the algorithm "II") per second for the SRNS GLONASS satellite.

Taking into account that the prediction time of the satellite position on the orbit according to the standard algorithm is on the average 1.850 ms for the SRNS GPS satellite and 0.675 ms for the SRNS GLONASS satellite, it is clear that the use of the algorithm "I" reduces the computational time by almost one order of magnitude while the use of the algorithm "II" reduces this time by a factor of three.

FIGS. 8–11 show the dependence of the mean square error of the calculation, respectively, of the coordinates and velocity of the satellite using the simplified algorithm "I" (in an interval of 20 seconds) and the algorithm "II" (in an interval of 60 seconds) for the SRNS GPS and SRNS GLONASS satellites respectively. From the graphs it is clear that the calculation error for both simplified algorithms does not exceed 0.18 m by position and 0.3 cm/s by velocity thus satisfying the requirements for accuracy of both absolute and differential navigation.

The calculation of the velocity ($V_s$) of the SRNS GPS satellite at the nodal points, the calculation of the coordinates ($X_s$) and velocity ($V_s$) of the SRNS GLONASS satellite at the nodal points is effected using the formulas given below.

An Example of Calculation of the Velocity of the SRNS GPS Satellite

The velocity of the SRNS GPS satellite at the nodal points is calculated by the ephemeris data using the formulas:

$$\dot{\varphi} = n \cdot \sqrt{1-e^2} / (1 - e \cdot \cos E_i)^2,$$

$$\dot{u} = a \cdot e \cdot n(1 + e \cdot \cos E_i) \cdot \sin E_i + 2_{\dot{\varphi}}(C_{RS} \cdot \cos 2\varphi - C_{RC} \cdot \sin 2\varphi);$$

$$\dot{u} = \dot{\varphi}(1 + 2(C_{US} \cdot \cos 2\varphi - C_{UC} \cdot \sin 2\varphi));$$

-continued $$\dot{i} = idot + 2_{\dot{\varphi}}(C_{IS} \cdot \cos 2\varphi - C_{IC} \cdot \sin 2\varphi);$$

$$\dot{x}_s = \cdot (\cos u \cdot \cos \Omega_i - \sin u \cdot \sin \Omega_i \cdot \cos i) - (\dot{\Omega} - w_E) \cdot y + i \cdot z \cdot \sin \Omega_i - r \ldots (\sin u \cdot \cos \Omega_i + \cos u \cdot \sin \Omega_i \cdot \cos i);$$

$$\dot{y}_s = \cdot (\cos u \cdot \sin \Omega_i + \sin u \cdot \cos \Omega_i \cdot \cos i) + (\dot{\Omega} - w_E) \cdot x - i \cdot z \cdot \cos \Omega_i + r \ldots (\cos u \cdot \cos \Omega_i \cdot \cos i - \sin u \cdot \sin \Omega_i) -$$

$$\dot{z}_s = \cdot \sin u \cdot \sin i + r \ldots \cos u \cdot \sin i + r \cdot i \cdot \sin u \cdot \cos i.$$

Here, like in the standard method of calculation of the coordinate of the SRNS GPS satellite:

e is the eccentricity at the instant $t_{0_e}$;

$\dot{\Omega}$ is the velocity of the precession of the ascending node $t_{0_e}$;

$C_{RC}$, $C_{RS}$ are the amplitudes of the cosine and sine corrections to the orbit radius;

$C_{UC}$, $C_{US}$ are the amplitudes of the cosine and sine corrections to the latitude;

$C_{IC}$, $C_{IS}$ are the amplitudes of the cosine and sine corrections to the inclination;

idot is the rate of change of the inclination at the instant $t_{0_e}$; and $W_E = 7.2921151467 \cdot 10^{-5}$ is the earth angular velocity in rad/s, while the values n, a, $E_i$, $\phi$, i, u, $\Omega_i$, r are the intermediate results in the calculation of the SRNS GPS satellite using the standard method.

The Calculation of the Coordinates and Velocity of the SRNS GLONASS Satellite The calculation of the coordinates and velocity of the SRNS GLONASS satellite by the ephemeredes at the nodal points is effected using the six-order Taylor polynomial expansion in two steps: calculation of the Taylor polynomial coefficients and determination of the coordinates and velocity.

Step 1. Calculation of the Taylor Polynomial Coefficients

The input data:

$X_{OS} = x_{0s}, y_{0s}, \approx 0s$ are the satellite coordinates at instant $t_0$ $V_{OS} = x_{0s}, y_{0s}, \approx 0s$ are the satellite coordinates at instant $t_0$ $t_0$ is the reference time of the GLONASS ephemeredes The output data:

$f_2, \ldots f_6,$ $g_3, \ldots g_6,$ $m_2, m_3, m_4$ are the Taylor polynomial coefficients $X_{On}, Y_{On}$ are the velocities $x_0, y_0$ in the inertial system of coordinates c, d are parameters Constants of PZ-90:

$R_E = 6378136$ m is the earth equatorial radius $J_2 = 0.00108263$ is the geopotential second zonal harmonic $\mu = 3.9860044 \cdot 10^{14}$ is the gravitational constant $m_3/c_2$ $W_E = 0.00007292115$ rad/s is the Earth's angular velocity The Taylor polynomial coefficient is calculated using the formulas:

the velocities in the geocentric inertia system of coordinates:

$$\dot{x}_{On} = \dot{x}_0 - W_E \cdot y_0,$$

$$\dot{y}_{On} = \dot{y}_0 + W_E \cdot x_0,$$

the modulus of the radius-vector:

$$d=(x_0^2+y_0^2+z_0^2)^{-1/2}$$

$$c=\mu \cdot d$$

the square of the velocity vector:

$$V=\dot{x}_{0n}^2+\dot{y}_{0n}^2+\dot{z}_0^2;$$

the rate of change of the radius-vector:

$$\dot{r}=d\cdot(x_{0n}\dot{x}_{0n}+y_{0n}\dot{y}_{0n}+z_0\dot{z}_0);$$

the coefficients:

$$b=z_0\cdot d,\ a=\{1/4R_E^2\cdot J_2\}\cdot d^2,\ u=1/2V-1/3c$$

The Taylor polynomial coefficients:

$$\{f_0 = 1, f_1 = 0\}, \quad f_2 = -\frac{1}{2} + 3\cdot a\cdot(5b^2 - 1),$$

$$f_3 = 10\cdot a\cdot b\cdot z_0 + \dot{r}\cdot\left(\frac{1}{2} + 5\cdot a\cdot(1 - 7\cdot b^2)\right),$$

$$f_4 = \frac{1}{4}\cdot u - \frac{5}{8}\cdot \dot{r}^2 + a\cdot\left(\frac{5}{2}\cdot \dot{z}_0^2 - b^2\cdot\left(\frac{35}{4}\cdot V - 6\cdot c\right) - 35\cdot \dot{r}\cdot b\cdot \dot{z}\right),$$

$$f_5 = -\frac{3}{4}\cdot \dot{r}\cdot u, \quad f_6 = \frac{11}{120}\cdot c\cdot\left(u + \frac{1}{2}\cdot V\right) - \frac{1}{16}\cdot V^2;$$

$$\{g_0 = 0, g_1 = 1, g_2 = 0\}, \quad g_3 = \frac{1}{3}\cdot f_2, \quad g_4 = \frac{1}{2}\cdot f_3,$$

$$g_5 = \frac{3}{5}\cdot(f_4 - c\cdot g_3^2), \quad g_6 = \frac{2}{3}\cdot f_5 - c\cdot g_3\cdot g_4;$$

$$\{m_0 = m_1 = 0\}, \quad m_2 = -6\cdot a, \quad m_3 = 10\cdot a\cdot \dot{r},$$

$$m_4 = \frac{5}{2}\cdot a\cdot\left(V - \frac{4}{5}\cdot c\right).$$

Step 2 The Calculation of the Coordinates and Velocities
The input data:

$X_{OS}=x_{0s}, y_{0s}, z_{0s}$: are the satellite coordinates at instant $t_0$ $V_{OS}=\dot{z}_{0s}, \dot{x}_{0s}, \dot{y}_{0s}$: are the satellite velocities at instant $t_0$ in the inertia system of coordinates $t_0$ is the reference time of the GLONASS ephemeredes $\ddot{x}_{0s}, \ddot{y}_{0s}, \ddot{z}_{0s}$ are the acceleration by the Moon and Sun at the instant $t_0$ $f_2, \ldots f_6$.

$g_3, \ldots g_6$, $m_2, m_3, m_4$ are the coefficients at the instant $t_0$ c, d are parameters at the instant $t_0$ t is the preset time $\tau_p$ is the time of propagation of the signal $\tau_0, \gamma_0$ is the difference between the GLONASS system time and the satellite time at the instant $t_0$ The output data:

$X_s=x_s, y_s, z_s$ are the satellite coordinates at the instant t $V_s=\dot{x}_s, \dot{y}_s, \dot{z}_s$ are the satellite velocity at the instant t $a_1, a_2$ is the difference between the GLONASS time scale and the satellite time scale at the instant t.

The position of the SRNS GLONASS satellite is calculated by the following formulas:

the prediction interval: $\Delta t=t_y-t_0$;

the coefficients for calculation of the coordinates:

$$p=\Delta t\cdot d,\ h=p^2\cdot c,$$

$$F=((((f_6\cdot p+f_5)\cdot P+f_3)\cdot p+f_2)\cdot h+1,$$

$$G=g_6\cdot p+g\cdot p+g\cdot p+g\cdot +t$$

$$M=((m_4\cdot p+m_3)\cdot P+m_2)\cdot H,$$

$$N=1/3m_2\cdot h\cdot \Delta t;$$

the coefficients for calculation of the velocities:

$$h1=p\cdot c\cdot d;$$

$$F1=((((6\cdot f_6\cdot p+5\cdot f_5)\cdot p+4\cdot f_4)\cdot p+3\cdot f_3)\cdot p+2\cdot f_2)\cdot h1;$$

$$G1=((((6\cdot g_6\cdot p+5\cdot g_5)\cdot p+4\cdot g_4)\cdot p+3\cdot g_3)\cdot h1;$$

$$M1=((((4\cdot m_4\cdot p+3\cdot m_3)\cdot P+2\cdot m_2)\cdot h1;$$

$$N1=m_2\cdot h;$$

the time parameter: $\epsilon=1/2\Delta t^2$;

the coordinates and the velocities in the geocentric inertia system of coordinates:

$$x_1=F\cdot x_{0s}+G\cdot \dot{x}_{0n}+\epsilon\cdot \ddot{x}_{0s}$$

$$y_1=F\cdot y_{0s}+G\cdot \dot{y}_{0n}+\epsilon\cdot \ddot{y}_{0s},$$

$$\dot{x}_1=F1\cdot x_{0s}+G1\cdot \dot{x}_{0n}+\Delta t\cdot \ddot{x}_{0s}$$

$$\dot{y}_1=F1\cdot y_{0s}+G1\cdot \dot{y}_{0n}+\Delta t\cdot \ddot{y}_{0s};$$

the coefficient of rotation:

$$s=\sin(w_E(\Delta t+\tau_p))$$

$$k=\cos(w_E(\Delta t+\tau_p))$$

The Greenwich geocentric coordinates and velocities:

$$x_s=x_1\cdot k+y_1\cdot s$$

$$y_s=-x_1\cdot s+y_1\cdot k;$$

$$z_s=(F+M)\cdot z_{0s}+(G+N)\cdot \dot{z}_{0s}+\epsilon\cdot \ddot{z}_{0s};$$

$$\dot{x}_s=\dot{x}_1\cdot k+\dot{y}_1\cdot s+w_E\cdot y_s$$

$$\dot{y}_s=-\dot{x}_1\cdot s+\dot{y}_1\cdot k-w_E\cdot x_s$$

$$\dot{z}_s=(F1+M1)\cdot z_{0s}+(G1+N1)\cdot \dot{z}_{0s}+\Delta t\cdot \ddot{z}_{0s}.$$

The correction for the earth rotation for the algorithm "II" is not taken into account in the calculation of the velocities.

The calculation of the acceleration of the SRNS GPS or GLONASS satellite at the nodal points and the simplified algorithm "I" for the calculation of the coordinates and velocities of the SRNS GPS or GLONASS satellite at an arbitrary instants of time within the interval limited by the nodal points is effected according to the formulas given below.

An Example of the Acceleration Calculation

The acceleration is taken constant within the whole 20-second interval. The acceleration vector is calculated for the center of the 20-second interval using the formula:

$$\ddot{p}_s(t_{y-1} + 10c) = \frac{\dot{p}_s(t_y) - \dot{p}_s(t_{y-1})}{20c} \text{ where } p \subset \{x, y, z\}$$

An Example of Calculation of the Satellite Coordinates and Velocities

The position and velocity of the SRNS GPS, GLONASS satellite at any random instant of time within the 20-second interval are calculated from the nearest nodal point using the following formulas:

the prediction interval: $\Delta t = t - t_s$
where $t_s =$ $t_{y-1}$ at $t - t_{y-1} < 10$ sec $t_{y-1}$ at $t_y - t \geq 10$ sec the satellite position:

$$\bar{x}_s(t) = \bar{x}_s(t_s) + \bar{\dot{x}}_s(t_s) \cdot \Delta t + \bar{\ddot{x}}_s(t_s) \cdot \frac{\Delta t^2}{2}$$

the satellite velocity:

$$\bar{\dot{x}}_s(t) = \bar{\dot{x}}_s(t_s) + \bar{\ddot{x}}_s(t_s) \cdot \Delta t$$

The simplified algorithm "II" of calculation of the coordinates and velocite of the SRNS GPS or GLONASS satellite at random instants of time within the interval restricted by the nodal points is effected using the formulas given below.

An Example of Calculation of the Third-order Taylor Polynomial

The calculation of the coefficients of the Taylor polynomial is performed using the formulas:

the modulus of the radius-vector: $d = (x_s^2 + y_s^2 + y_s^2)^{1/2}$ the coefficients: $b = z_s \cdot d$, $a = \{1/4 \cdot R_E^2 \cdot J2\} \cdot d^2$;

the Taylor polynomial coefficients: $f = \{-1/2 + 3 \cdot a \cdot (5b^2 - 1)\} \cdot \mu \cdot d^3$, $g = f/3$.

An Example of Calculation of the NCA Coordinates and Velocities

The position and velocity for the SRNS GPS, GLONASS satellite at any arbitrary instant of time within the 60-second interval are calculated from the nearest nodal point using the formulas:

the prediction interval: $\Delta t = t - t_s$;

the coefficients for the coordinates: $F = 1 + f \cdot \Delta t$  $G = (1 + g \cdot \Delta t^2) \cdot \Delta t$;

the coefficients for the velocities: $F1 = 2 \cdot f \cdot F \cdot \Delta t$;  $G1 = F$;

the coordinates and velocities in the geocentric inertia system of coordinates:

$x_1 = F \cdot x_S + G \cdot \dot{x}_S$   $\dot{x}_1 = F1 \cdot x_S + G1 \cdot \dot{x}_S$
$y_1 = F \cdot y_S + G \cdot \dot{y}_S$   $\dot{y}_1 = F1 \cdot y_S + G1 \cdot \dot{y}_S$ coefficient of rotation: $s = \sin(w_E \cdot (\Delta t + \tau_p))$  $k = 1 - s^2/2$ the Greenwich geocentric coordinates and velocities:

$\dot{x}_1 = F1 \cdot x_s + G1 \cdot \dot{x}_s$ $\dot{y}_1 = F1 \cdot y_s + G1 \cdot \dot{y}_s$ $x_s = x_1 \cdot k + y_1 \cdot s + w_E \cdot y_s$;

$y_s = -x_1 \cdot s + y_1 \cdot k - w_E \cdot x_s$;

$z_s = F1 \cdot z_s + G1 \cdot \dot{z}_s$.

The above-discussed computational algorithms providing a prediction determination of the position of SRNS satellite on the orbit by the ephemeredes are realized by means of standard computers.

From the above it is clear that the claimed invention is industrially applicable and attains the technical object on reducing the computational cost and saves time (from a factor of three to ten) when determine the path of the SRNS satellite due to the use of a combined (two-step) process of determining the path of the satellite, in which the standard algorithm is used in the calculation of only definite nodal points of the satellite path: once in some time interval, while the intermediate points within this interval are calculated by a simplified procedure using simple polynomial formulas, the coefficients for which are calculated at the first step of application of the standard computational algorithm—by the position and velocity of the satellite at the nodal points. The claimed invention is very promising, especially in small-size (portable, pocket) SRNS GPS and/or GLONASS receivers.

What is claimed is:

1. A method for determining coordinates of a satellite of a satellite radio navigation system on orbit wherein ephemeredes known a priori at an initial instant of time are used for determining extrapolated coordinates of the satellite on the orbit in a sequential series of arbitrary points, the method comprising:

determining coordinates of the satellite at preset nodal points of the orbit, the nodal points being spaced from each other by a selected time interval;

determining velocities of the satellite at the nodal points; and determining the coordinates of the satellite at points between the nodal points in a geocentric inertial system of coordinates, using a simplified computational algorithm.

2. The method according to claim 1, wherein a computational algorithm of a six-order Taylor polynomial is used for determining the coordinates and velocities of the satellite of the satellite radio navigation system at the nodal points of the orbit.

3. The method according to claim 1, wherein a computational algorithm of one of a second-order and a third-order Taylor polynomial is used for determining the coordinates of the satellite at the points between the nodal points of the orbit.

4. The method according to claim 1, wherein said simplified computational algorithm is defined by:

$x_1 = F \cdot x_s + G \cdot \dot{x}_s$ $y_1 = F \cdot y_s + G \cdot \dot{y}_s$ wherein F and G are coefficients for calculation of the coordinates, where:

$F = 1 + f \cdot \Delta t^2$;  $G = (1 + g \cdot \Delta t^2) \cdot \Delta t$, where $\Delta t$ is a prediction time interval.

5. A method for determining coordinates of a satellite of a satellite radio navigation system on orbit, wherein ephemeredes known a priori at an initial instant of time are used for determining extrapolated coordinates of the satellite on the orbit in a sequential series of arbitrary points, the method comprising:

determining the coordinates of the satellite at preset nodal points of the orbit, the nodal points being spaced from each other by a selected time interval;

determining satellite velocities at the nodal points; and determining, at points between the nodal points, the coordinates of the satellite in Greenwich geocentric coordinates, using a simplified computational algorithm.

6. The method according to claim 5, wherein the coordinates and velocity of the satellite of the satellite radio navigation system at the nodal points of the orbit are determined using computational algorithm of a sixth-order Taylor polynomial.

7. The method according to claim 5, wherein one of a second-order and a third-order Taylor polynomial is used for determining the coordinates of the satellite at the intermediate points of the orbit.

8. The method according to claim 5, wherein said simplified computational algorithm is defined by:

$$x_s = x_1 \cdot k + y_1 \cdot s;$$

$$y_s = -x_1 \cdot s + y_1 \cdot k;$$

$$z_s = F \cdot z_s + G \cdot \dot{z}_s;$$

wherein k and s are coefficients of rotation, where:

$$s = \sin(w_E \cdot (\Delta t + \tau_p))$$

$$k = \cos(w_E \cdot (\Delta t + \tau_p))$$

and F and G are coefficients for calculation of the coordinates where:

$$F = 1 + f \cdot \Delta t^2;$$

$$G = (1 + g \cdot \Delta t^2) \cdot \Delta t,$$

where $\Delta t$ is an interval of prediction.

* * * * *